United States Patent

[11] 3,575,613

[72] Inventor Michel A. Ebertin
Yorba Linda, Calif.
[21] Appl. No. 805,305
[22] Filed Mar. 7, 1969
[45] Patented Apr. 20, 1971
[73] Assignee North American Rockwell Corporation

[54] LOW POWER OUTPUT BUFFER CIRCUIT FOR MULTIPHASE SYSTEMS

7 Claims, 2 Drawing Figs.

[52] U.S. Cl. .......... 307/242, 307/205, 307/208, 307/251, 307/246
[51] Int. Cl. .......... H03k 17/60
[50] Field of Search .......... 307/205, 242, 251, 279, 304

[56] References Cited

UNITED STATES PATENTS

| | | | |
|---|---|---|---|
| 3,431,433 | 3/1969 | Ball et al. .......... | 307/251X |
| 3,480,796 | 11/1969 | Polkinghorn et al. .......... | 307/205X |
| 3,483,400 | 12/1969 | Washizuka et al. .......... | 307/279 |
| 3,506,851 | 4/1970 | Polkinghorn et al. .......... | 307/251 |

*Primary Examiner*—John S. Heyman
*Attorneys*—William R. Lane, L. Lee Humphries and Robert G. Rogers

ABSTRACT: A first switching device is connected between an output terminal and a voltage potential representing a logic one state. A second switching device is connected between the output terminal and a voltage potential representing a logic zero state. The devices are conditionally turned on as a function of the logic state of the potential on an input terminal to the buffer circuit. If the input terminal is set to a logic zero state, one device is turned on to connect the logic zero potential to the output terminal. Similarly, if the input terminal is set to a logic one state, the other device is turned on to connect the logic one potential to the output terminal. The switching devices never connect the voltage potentials to ground. As a result, excessive power dissipation is avoided.

PATENTED APR 20 1971 3,575,613

INVENTOR.
MICHEL A. EBERTIN

BY Robert G. Rogers

ATTORNEY

LOW POWER OUTPUT BUFFER CIRCUIT FOR MULTIPHASE SYSTEMS

BACKGROUND OF THE INVENTION

1. Field of the Invention

The invention relates to a low power output buffer circuit for multiphase systems and more specifically to such a buffer circuit in which power dissipation is reduced by using a plurality of independently operated switching devices having a common connection to an output terminal for setting said output terminal to a voltage potential representing the logic state of a potential on the input terminal of the circuit.

2. Description of Prior Art

In a multiphase gating system, buffer circuits are often required to provide the necessary output power and impedance to other systems connected to the terminal. In order to accommodate the power requirements of the other systems, it is often necessary to increase the size of the buffering devices. Many circuits have been used which require excessive power dissipation.

The present invention provides a low power output buffer circuit which uses independently operated switching devices having a geometry according to the required output impedance. In addition, the circuit can be produced with switching devices, other than the output devices, which have the same sizes as contrasted with certain prior art buffering circuits in which different sized devices were required.

SUMMARY OF THE INVENTION

Briefly, the invention comprises a low power buffer circuit for use with a multiphase system. The circuit includes a plurality of independently operated switching devices having a common connection to an output terminal for conditionally setting the output terminal to a voltage potential representing the logic state of the potential on the input terminal of the circuit. The circuit also includes a plurality of means responsive to the potential on the input terminal for actuating one of the devices for setting said output terminal to the potential representing the potential of the input terminal and for simultaneously holding the other switching devices off. The switching devices are connected only to said output terminal and not through an impedance to electrical ground so that power dissipation is reduced.

In a preferred embodiment, the switching devices are implemented by MOS devices. However, MNS devices, MNOS devices, or other enhancement mode field effect devices may be used. It should also be pointed out that although P channel devices are described in connection with the preferred embodiment, N channel devices could also be used. If N channel devices were used, it would be necessary to change the polarities of the potentials involved. Such details are believed well-known to persons skilled in the art.

Therefore, it is an object of this invention to provide an improved low power output buffer circuit for use with multiphase systems.

It is still another object of this invention to provide an output buffer circuit which minimizes the size of switching devices used in implementing the circuit.

A still further object of this invention is to provide a low power output buffer circuit for use with a multiphase system in which the voltage potentials used during the circuit operation are not connected to ground.

A still further object of this invention is to provide a buffer circuit in which the only power dissipated in the circuit is that required to charge and discharge capacitors used in controlling the voltage potential appearing on the output terminal as a function of the voltage potential appearing on the input terminal.

A still further object of the invention is to provide a buffering circuit in which two output switching devices are connected between voltage sources representing different logical states and to a common output terminal in a push-pull relationship.

A still further object of this invention is to provide a buffering circuit between an input terminal and an output terminal for providing the required power output at the output terminal as a function of the logic state of the potential on the input terminal without dissipating excessive power.

These and other objects of this invention will become more apparent in connection with the description of drawings, a brief description of which follows.

DESCRIPTION OF PREFERRED EMBODIMENT

Figure 1:
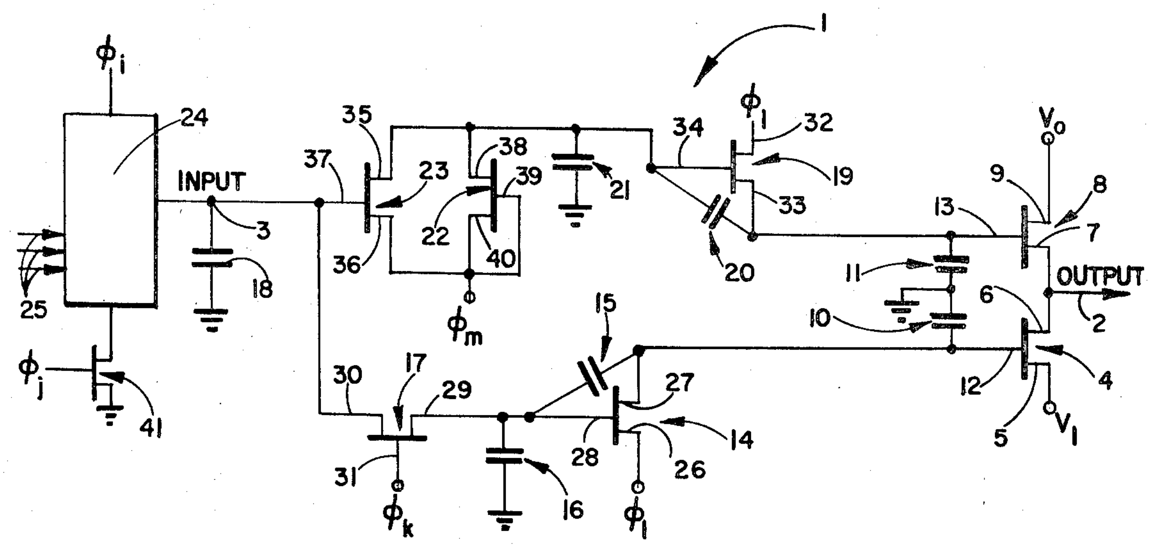
FIG. 1 is a schematic of one embodiment of a low power output buffer circuit for use with multiphase systems.

FIG. 1 illustrates a preferred embodiment of low power buffer circuit 1 having output terminal 2 and input terminal 3. Switching device 4, such as a MOS transistor, has electrode 5 connected to voltage potential $V_1$ which represents a logic one state. Electrode 6 is connected to the output terminal 2 and to electrode 7 of switching device 8. Electrode 9 of switching device 8 is connected to voltage potential $V_0$ representing a logic zero state for the output terminal 2. Capacitors 10 and 11 are connected to control electrodes 12 and 13 of switching devices 4 and 8, respectively. The logic one channel of the buffer circuit comprises switching device 14, feedback capacitor 15, capacitor 16, and switching device 17 connected between control electrode 12 and input terminal 3. Capacitor 18 is connected between the input terminal 3 and ground. The logic zero channel of the buffer circuit 1 comprises switching device 19, feedback capacitor 20, capacitor 21, switching device 22 and switching device 23 connected between control electrode 13 and input terminal 3.

Logic function 24 having clock signal inputs $\Phi_i$ and $\Phi_j$, and including logic inputs represented by the numeral 25, is connected to the input terminal 3. It is pointed out that the logic function is illustrated in block diagram form since details of the logic function vary according to the particular function being implemented. For example, a logic function may comprise a plurality of MOS devices connected in series having their gate electrodes connected to control voltages. An example of one type of logic function can be seen by referring to the patent application entitled "Multiple Phase Gating System," Ser. No. 523,767 filed Jan. 28, 1966, by Robert K. Booher.

MOS device 14 comprises electrode 26 connected to clock signal $\Phi_1$ and electrode 27 connected to control electrode 12 of MOS device 4. Capacitor 15 is connected between electrode 27 and control electrode 28 of MOS device 14 to feed back the voltage on the electrode 20 during the operation of the circuit for increasing the drive voltage on control electrode 28 until the output voltage on electrode 27 is equal to the clock signal, $\Phi_1$. Additional details on a MOS device which uses a feedback capacitor can be found in patent application entitled "Isolation Circuit for Gating Devices" filed Jan. 7, 1969, Ser. No. 789,441, by Robert W. Polkinghorn et al.

Capacitor 16 is connected between control electrode 28 and ground for providing an initial control voltage on electrode 28 as a function of the voltage on input terminal 3 during the operation of the circuit as described subsequently. The capacitor 16 is also connected to electrode 29 of MOS device 17 which has its other electrode 30 connected to the input terminal 3. The control electrode 31 of MOS device 17 is connected to clock signal $\Phi_K$.

MOS device 19 in the logic zero channel, has one electrode 32 connected to clock signal $\Phi_1$ and its other electrode 33 connected to control electrode 13 of MOS device 8. Capacitor 20 is connected between electrode 33 and control electrode 34 as a feedback capacitor as described in connection with MOS device 14 for the logic one channel.

Capacitor 21 is connected between control electrode 34 and ground. In addition, the capacitor is connected to electrode 35 of MOS device 23 which has its other electrode 36 connected to clock signal $\Phi_m$. Control electrode 37 of MOS device 23 is connected to input terminal 3 in order to disable the logic zero channel when the input terminal is set to a logic one state.

Capacitor 21 is also connected to electrode 38 of MOS device 22 which has its control electrode 39 and its other electrode 40 connected to clock signal $\Phi_m$ for charging capacitor 21 to the voltage level of the $\Phi_m$ clock signal (reduced by the threshold of the MOS device 22) during the circuit operation.

Figure 2:
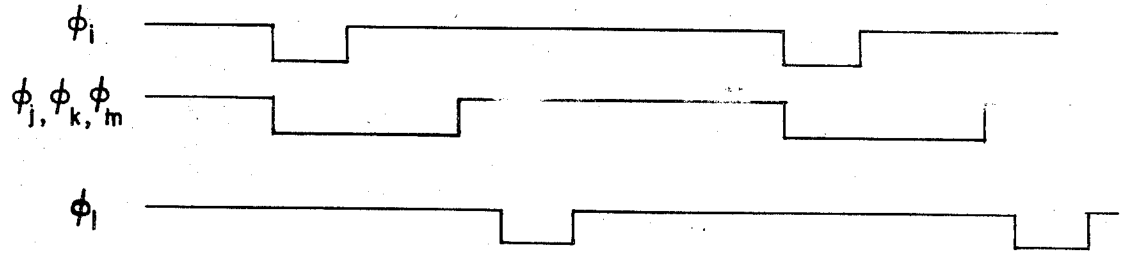
FIG. 2 is an illustration of multiphase signals used by the FIG. 1 circuit.

The operation of the circuit can be understood by referring to the clock signals shown in FIG. 2 and by referring to the circuit shown in FIG. 1. The multiphase signals comprise the $\Phi_i$ clock signal which must terminate before the $\Phi_j$ clock signal terminates. The $\Phi_j$ clock signal shown as being identical with the $\Phi_k$ and $\Phi_m$ clock signals, must have a true interval at least after the end of the true interval of $\Phi_i$ signal. For purposes of this description, the true (negative) interval of, for example, the $\Phi_i$ signal, is described as $\Phi_i$ time. Similarly, the true interval of the $\Phi_m$ clock signal is described as $\Phi_m$ time. The $\Phi_k$ signal must have a true interval that exists at least during the $\Phi_i$ time and during $\Phi_j$ time. The true interval must end before the $\Phi_1$ time. The $\Phi_m$ signal must have a true interval which does not end before the end of $\Phi_j$ time but which must terminate before $\Phi_1$ time. The $\Phi_1$ true interval cannot exist concurrently with either $\Phi_k$, $\Phi_j$, or $\Phi_m$ times. The $\Phi_1$ true interval must terminate before $\Phi_i$ time begins, however.

For the specific embodiment being described, it is possible that the $\Phi_i$, $\Phi_k$ and $\Phi_m$ times exist simultaneously. It should be noted that for other embodiments, it is only necessary that the signals have the true intervals as indicated above.

In operation, during $\Phi_i$ time, the input terminal 3 is connected to the negative voltage level of the $\Phi_i$ clock which represents a logic one state. Since the $\Phi_k$ signal is also true during $\Phi_i$ time, device 17 is turned on.

Capacitors 18, 16, and 15 are charged to the voltage level appearing at the input terminal 3 assuming that the $\Phi_k$ signal has a negative level at least one threshold more negative than the voltage appearing at the input terminal. As a result of unconditionally charging capacitor 16, MOS device 14 is turned on. Since the $\Phi_1$ clock signal is ground during $\Phi_i$ time, capacitor 10 is connected to a ground level as is electrode 12. As a result, device 4 is turned off.

During $\Phi_j$ time, the inputs 25 to logic function 24 are evaluated to determine the logic state of function 24. If the logic function is true, the input terminal 3 is connected to ground through MOS device 41 and capacitor 18 is discharged to a ground logic level representing a logic zero for the embodiment described. Similarly, since the $\Phi_k$ signal is true during $\Phi_j$ time, capacitors 16 and 15 are also discharged to ground through MOS device 17 and logic function 24. As a result, MOS device 14 is turned off and the logic one channel is discharged.

During $\Phi_m$ time, MOS device 22 is turned on so that capacitors 20 and 21 are charged to a voltage potential within the range of a logic one level. For the particular embodiment shown, the capacitors would have been charged during $\Phi_i$ time since the $\Phi_m$ signal was true during $\Phi_i$ time. If capacitor 20 had been charged during $\Phi_i$ time, capacitor 11 would have been connected to the ground level of $\Phi_1$ as would have electrode 13. As a result, device 8 would have been turned off.

As shown in FIG. 2, the $\Phi_m$ clock signal is false before the clock signal $\Phi_1$ is true. If the input terminal 3 had been set to a false logic potential during $\Phi_j$ time, devices 22 and 23 remain off during the interim period.

During $\Phi_1$ time, $\Phi_k$, $\Phi_m$, and $\Phi_i$ are false. Since MOS device 23 remains off when input terminal 3 is set to a logic zero potential, capacitors 21 and 20 remain charged during $\Phi_1$ time and MOS device 19 is turned on. The output voltage appearing on electrode 33 increases the voltage on control electrode 34 so that the electrode 33 is driven to the voltage level of the clock signal $\Phi_1$. Therefore, capacitor 11 is charged to the potential of the $\Phi_1$ clock signal for turning MOS device 8 on. When MOS device 8 is turned on, the voltage $V_0$ representing the logic zero state appears on the output terminal 2. The size of the MOS device 8 is determined by the output impedance required between the output terminal and the $V_0$ voltage.

On the other hand, if the logic function 24 was false during $\Phi_j$ time, the input terminal would remain set at logic one voltage level so that capacitors 15 and 16 would remain charged during $\Phi_1$ time. In addition, between $\Phi_m$ time and $\Phi_1$ time, device 23 is turned on so that capacitors 21 and 20 are discharged to the ground level of clock $\Phi_m$. As a result, during $\Phi_1$ time, MOS device 19 remains off to disable the logic zero channel.

During the $\Phi_1$ time, the clock signal level appearing on electrode 27 is fed back through capacitor 15 to increase the control electrode voltage of MOS device 14 for driving the output electrode 27 to the voltage level of a clock as previously described in connection with MOS device 19. Capacitor 10 charges to the clock signal level for turning MOS device 4 on. When MOS device 4 is turned on, the voltage $V_1$, representing a logic one state, appears at output terminal 2. The size of MOS device 4 is also determined by the desired output impedance between the output electrode and the voltage source represented generally by $V_1$.

It should be obvious from the above description that the buffer circuit 1 dissipates relatively no DC power. The only power dissipated is that required to charge and discharge the various capacitors described and shown. The circuit is designed so that there are no resistive paths between any of the potential sources, including the clock signal sources, and ground. As a result, transistors 14, 17, 19, 22 and 23 may be implemented with the minimum required geometry associated with the respective MOS fabrication process.

The geometries of transistors of MOS devices 4 and 8 as indicated above, are determined by the desired output impedance. It is also noted that MOS devices 4 and 8 operate independently of each other in a mutually exclusive mode (push-pull). In a push-pull device such as described in connection with FIG. 1, an inverter stage is required. In the buffer circuit 1, the inverter stage is comprised of the combination of transistors 22 and 23. Since both devices are operated in a ratioless manner, the inverter stage utilizes little or no power.

I claim:

1. A buffer circuit for use in a system using a multiphase clock cycle and having an input terminal for receiving voltage levels representing logic states and an output terminal, said circuit comprising, first and second switching devices having a common connection to said output terminal for setting said output terminal to voltage levels representing the logic states of the voltage levels on said input terminal, first control means including a first storage capacitor means for rendering said first switching device conductive during one phase time of said multiphase clock cycle if said input terminal is set to a voltage level representing a first logic state, said first control means including means for storing a charge on said first storage capacitor means representing said first logic state and for isolating said first storage capacitor means from said input terminal prior to said one phase, said stored charge enabling the conduction of said first switching device, second control means including a second storage capacitor means for rendering said second switching device conductive during said one phase time of said multiphase clock cycle if said input terminal is set to a voltage level representing a second logic state, said second control means including means for storing a charge on said second storage capacitor means and for isolating said second storage capacitor means from said input terminal prior to said one phase, said stored charge enabling the conduction of said second switching device.

2. A buffer circuit for use in a system using a multiphase clock cycle and having an input terminal for receiving voltage levels representing logic states and an output terminal, said circuit comprising, first and second switching devices having a common connection to said output terminal for setting said output terminal to voltage levels representing the logic states of the voltage levels on said input terminal, first control means including a first storage capacitor means for rendering said first switching device conductive during one phase time of said multiphase clock cycle if said input terminal is set to a voltage level representing a first logic state, said control means including means for storing a charge on said first storage capacitor means representing said first logic state and for isolating said first storage capacitor means from said input terminal prior to said one phase, said stored charge enabling the conduction of said first switching device, second control means including a second storage capacitor means for rendering said second switching device conductive during said one phase time of said multiphase clock cycle if said input terminal is set to a voltage level representing a second logic state, said second control means including means for storing a charge on said second storage capacitor means and for isolating said second storage capacitor means from said input terminal prior to said one phase, said stored charge enabling the conduction of said second switching device, said means for storing a charge on said first and second storage capacitor means including means for charging said first and second storage capacitor means to a voltage level representing a first logic state and during a first phase time of said multiphase clock cycle, and said second control means including field effect transistor means for discharging said second storage capacitor means to a voltage level representing said second logic state if said input terminal is set to a voltage level representing said first logic state during a second phase time of said multiphase clock cycle, said second phase time occurring prior to said one recited phase, said first control means including field effect transistor means for discharging said first storage capacitor means to a voltage level representing said second logic state if said input terminal is set to a voltage level representing said second logic state during said second phase time of said multiphase clock cycle.

3. A buffer circuit for use in a system using a multiphase clock cycle and having an input terminal for receiving voltage levels representing logic states and an output terminal, said circuit comprising, first and second switching devices having a common connection to said output terminal for setting said output terminal to voltage levels representing the logic states of the voltage levels on said input terminal, first control means including a first storage capacitor means for rendering said first switching device conductive during one phase time of said multiphase clock cycle if said input terminal is set to a voltage level representing a first logic state, said first control means including means for storing a charge on said first storage capacitor means representing said first logic state and for isolating said first storage capacitor means from said input terminal prior to said one phase, said stored charge enabling the conduction of said first switching device, second control means including a second storage capacitor means for rendering said second switching device conductive during said one phase time of said multiphase clock cycle if said input terminal is set to a voltage level representing a second logic state, said second control means including means for storing a charge on said second storage capacitor means and for isolating said second storage capacitor means from said input terminal prior to said one phase, said stored charge enabling the conduction of said second switching device, said means for storing a charge on said second storage capacitor means including a first field effect transistor connected between said second storage capacitor means and a voltage source for providing a voltage level representing said first logic state during a first phase time of said multiphase clock cycle, and said means for isolating said second storage capacitor means comprising a second field effect transistor connected between said capacitor means and a voltage source for providing a voltage level representing said second logic state during a second phase time of said multiphase clock cycle prior to said recited one interval if said input terminal is set to a voltage level representing said second logic state, said second field effect transistor having a gate electrode connected to said input terminal.

4. A low power push-pull driver circuit used as a buffer stage between a common input terminal and a common output terminal of a multiphase system, said driver comprising two push-pull output field effect transistors of like conductivity type for setting said output terminal to voltage potentials representing first and second logic states as a function of voltage potentials on the input terminal, first means for driving one of said field effect transistors in response to a first voltage potential on said input terminal for connecting said output terminal to a voltage representing a first logic state, and second means for driving said second field effect transistor in response to second voltage potential on said input terminal for setting said output terminal to a voltage representing said second logic state, said second means including an inverter stage comprising field effect transistor switching devices operated in a ratioless manner, said first and second means being electrically separated from each other between said common input and output terminals.

5. A low power buffer circuit for use with a multiphase system having first and second field effect transistors operated in a push-pull manner between first and second voltage levels and having a common output terminal, said circuit including an input terminal and comprising, a first control channel between said first field effect transistor and said input terminal, said first control channel including a third field effect transistor connected between the gate electrode of said first field effect transistor and a clock signal, a first storage and feedback capacitor connected between the gate electrode of said third field effect transistor and the gate electrode of said first field effect transistor, said first control channel further including a clocked inverter stage connected between the gate electrode of said third field effect transistor and said input terminal for inverting voltage levels on said input terminal and providing the inverted voltage levels to the gate electrode of said third field effect transistor, a second control channel connected between the gate electrode of said second field effect transistor and said input terminal, said second channel including a fourth field effect transistor connected between the gate electrode of said second field effect transistor and a clock signal, a second storage and feedback capacitor connected between the gate electrode of said fourth field effect transistor and the gate electrode of said second field effect transistor, said second channel further including a clocked fifth field effect transistor connected between said fourth field effect transistor and said input terminal for sampling voltage levels on said input terminal.

6. The circuit recited in claim 5 wherein said clocked inverter state includes a sixth field effect transistor for charging said first storage and feedback capacitor to a first voltage level during a first phase time of said multiphase clock cycle, and a seventh field effect transistor for discharging said capacitor to said second voltage level if the voltage level on said input terminal is the first voltage level during a subsequent phase time of said multiphase clocking cycle.

7. The circuit recited in claim 6 including means for providing a first voltage level at said input terminal during a first phase time of said multiphase clock cycle and means for rendering said clocked fifth field effect transistor conductive and said seventh field effect transistor on during said first phase time for charging said first and second capacitors to said first voltage level during said first phase time, said clocked fifth field effect transistor remaining conductive during a second phase time of said multiphase clock cycle for enabling said second capacitor to discharge to said second voltage level if the voltage level on the input terminal changes to said second voltage level during said second phase time.